(12) United States Patent
Katsuno et al.

(10) Patent No.: US 8,657,049 B2
(45) Date of Patent: Feb. 25, 2014

(54) VEHICLE, AND HARNESS WIRING STRUCTURE THEREFOR

(75) Inventors: Zentaro Katsuno, Saitama (JP); Nobuyuki Takenaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 226 days.

(21) Appl. No.: 13/226,527

(22) Filed: Sep. 7, 2011

(65) Prior Publication Data

US 2012/0061159 A1    Mar. 15, 2012

(30) Foreign Application Priority Data

Sep. 9, 2010    (JP) ................................. 2010-201572

(51) Int. Cl.
*B60K 13/02*    (2006.01)
*B60J 7/00*    (2006.01)
*H01B 7/00*    (2006.01)

(52) U.S. Cl.
USPC ................... 180/68.3; 174/72 A; 296/203.01; 439/445

(58) Field of Classification Search
USPC ................... 180/68.3; 296/203.01; 174/72 A; 439/445, 364, 247–248
See application file for complete search history.

(56) References Cited

U.S. PATENT DOCUMENTS

| | | | |
|---|---|---|---|
| 6,417,451 B1 * | 7/2002 | Uchiyama | 174/72 A |
| 2009/0023009 A1 * | 1/2009 | Yamaguchi | 428/598 |
| 2010/0032225 A1 * | 2/2010 | Oohashi et al. | 180/219 |
| 2011/0162885 A1 * | 7/2011 | Yamaguchi et al. | 174/72 A |

FOREIGN PATENT DOCUMENTS

JP    2010-057323    3/2010

* cited by examiner

*Primary Examiner* — John Walters
*Assistant Examiner* — James Triggs
(74) *Attorney, Agent, or Firm* — Squire Sanders (US) LLP (57) ABSTRACT

In a harness wiring structure, a covering member which covers electric wires has a mesh-like portion 80 which is formed of a mesh-like member and covers a wire connection portion where the electric wires are connected with each other. The mesh-like portion is formed on a horizontally extending portion. The mesh-like portion is arranged in the inside defined between left and right main frames. The mesh-like portion is covered with a seat and a fuel tank from above, and is covered with a rear fender from behind. The mesh-like portion is arranged below a cross pipe.

20 Claims, 7 Drawing Sheets

VEHICLE, AND HARNESS WIRING STRUCTURE THEREFOR

BACKGROUND

1. Field

Embodiments of the present invention relate to the harness wiring structure of a saddle-ride-type vehicle having a harness, wherein the harness is formed by tying plural electric wires in a bundle by covering the electric wires with a covering member. The harness electrically connects plural electric parts to each other, and the harness is arranged along a vehicle body frame.

2. Description of the Related Art

To electrically connect plural electric parts mounted on a vehicle to each other, there has been used a harness which is formed by tying plural electric wires in a bundle and by covering the plural electric wires with a covering member formed of a resilient resin member. Further, as an example of the conventional harness wiring structure, the following patent document 1 (JP-A-2010-57323) proposes the harness wiring structure which enhances water draining property of a harness mounted on an inner portion of a door panel by covering the harness with a mesh-like protective member.

However, the prior art proposed by patent document 1 adopts the constitution where the mesh-like protective member covers the whole harness mounted on the inner portion of the door panel thus giving rise to a drawback that a cost can increase. Further, for example, when a harness is wired in a saddle-ride-type vehicle such as a motorcycle, the harness is liable to get wet from rain or splashed water from a tire. Accordingly, with the use of the harness of the prior art, contrary to the protection of the harness, there also arises a possibility that water is liable to enter the inside of the harness. Particularly, water can enter a wire connection portion between electric wires in the inside of the harness. Therefore, there has been a demand for the harness wiring structure of a saddle-ride-type vehicle which is provided by taking such circumstances into consideration.

SUMMARY

The present invention has been made by taking such a task into consideration. It is an object of the present invention to provide a harness wiring structure of a saddle-ride-type vehicle which can enhance water draining property at a wire connection portion and also can suppress wetting of the wire connection portion with water while reducing a manufacturing cost.

The present invention is directed to the harness wiring structure of a saddle-ride-type vehicle having a harness. The harness can be formed by tying plural electric wires in a bundle by covering the electric wires with a covering member. The harness electrically connecting plural electric parts to each other, and can be arranged along a vehicle body frame. The vehicle body frame can include left and right main frames; the covering member can include a covering portion which covers the electric wires in a state where the electric wires are not exposed to the outside from an outer surface thereof. A mesh-like portion, formed of a mesh-like member, can cover a wire connection portion where the electric wires are connected with each other. The mesh-like portion is arranged in the inside defined between the left and right main frames.

According to another embodiment, the harness can include a vertically extending portion which extends in the vertical direction and a horizontally extending portion which extends in the horizontal direction. Additionally, the mesh-like portion is formed on the horizontally extending portion.

According to another embodiment, the mesh-like portion can be covered from above with a seat and a fuel tank.

According to another embodiment, the mesh-like portion can be covered from behind with a rear fender.

According to another embodiment the vehicle body frame can further include a cross pipe which connects the left and right main frames. Additionally, the mesh-like portion can be arranged below the cross pipe.

In yet another embodiment, the saddle-ride-type vehicle can further include an intake system which supplies air drawn through an air cleaner to an engine through a connecting tube and a throttle body. The mesh-like portion can include a widthwise portion which can extend in the vehicle widthwise direction, and the widthwise portion is arranged above the throttle body.

According to yet another embodiment, the saddle-ride-type vehicle can further include a rear cushion arranged on a side of the connecting tube, and the widthwise portion is arranged in front of the air cleaner, the connecting tube and the rear cushion.

In another embodiment, the connecting tube include a bent portion which is bent in a bulging manner toward the outside in the vehicle widthwise direction The widthwise portion can be arranged within a vehicle widthwise range corresponding to a distance from a vehicle widthwise outer end portion of the connecting tube to a vehicle widthwise outer end portion of the rear cushion.

According to another embodiment, the saddle-ride-type vehicle can further include an intake system which supplies air drawn through an air cleaner to an engine through a connecting tube and a throttle body. A rear cushion can be arranged on a side of a connecting tube. The mesh-like portion can include a longitudinal portion which extends in the longitudinal direction of the vehicle. The longitudinal portion is arranged within a vehicle widthwise range corresponding to a distance between both vehicle widthwise end portions of the rear cushion and in front of the rear cushion.

According to another embodiment, the mesh-like portion can be configured to maintain a tube shape by having an adhesive member laminated to the mesh-like member wound around the wire connection portion. The adhesive member can be is arranged at a position which avoids the wire connection portion.

According to the embodiment noted above, the wire connection portion where the electric wires are connected with each other is covered with the mesh-like portion. Therefore, water draining property can be enhanced at the wire connection portion where water is liable to enter the inside of the harness; trapping of moisture can thus be prevented. Further, the mesh-like portion is arranged in the inside defined between the main frames. Therefore, even in a saddle-ride-type vehicle where a harness is liable to get wet from water, it is possible to reduce exposure of the mesh-like portion, and thus the wire connection portion covered with the mesh-like portion, to water. Further, it is sufficient that the mesh-like portion does not cover the whole harness but covers a portion of the harness where the wire connection portion is provided, and the covering portion which is not in a mesh form is mounted on remaining portions of the harness and hence. Therefore, a harness with high water draining property can be formed at a low cost. In this manner, water draining property at the wire connection portion can be enhanced by the mesh-like portion and also wetting of the wire connection portion with water can be suppressed while realizing the reduction of a manufacturing cost.

According to other embodiments, in the vertical direction, the mesh-like portion is unnecessary since water is easily drained downward, while in the horizontal direction with small difference of elevation, water draining property of the wire connection portion can be enhanced thus preventing the intrusion of water into the inside of the harness more effectively.

According to other embodiments, the mesh-like portion can be shielded from above with the seat and the fuel tank. Therefore, wetting of the mesh-like portion with water from above the vehicle can be prevented.

With the provision of the rear fender in certain embodiments, it is possible to prevent wetting of the mesh-like portion with water from a rear side of the vehicle due to splashing of water, mud, or the like from a rear wheel.

The mesh-like portion can be covered with the cross pipe from above in certain embodiments; therefore, wetting of the mesh-like portion with water can be prevented more effectively.

The widthwise portion can be covered with the throttle body from below; therefore, wetting of the mesh-like portion with water from below can be prevented.

In certain embodiments, a vehicle rear side of the widthwise portion of the mesh-like portion can be covered with the air cleaner, the connecting tube, and the rear cushion. Therefore, the influence of splashing of water, mud, or the like from the rear wheel on the mesh-like portion can be further reduced.

According to other embodiments, the whole widthwise portion can be covered with the rear cushion and the connecting tube. Therefore, wetting of the widthwise portion with water from the rear wheel can be prevented more effectively.

According to other embodiments, a vehicle rear side of the longitudinal portion can be covered with the rear cushion. Therefore, the influence of splashing of muddy water or the like from the rear wheel on the mesh-like portion can be reduced more effectively.

According to other embodiments, the mesh-like member can be wound around the wire connection portion and is fixed by the adhesive member. Therefore, the mesh-like member can be easily mounted on the wire connection portion, and also the mesh-like member can be easily mounted on the wire connection portion after wiring the harness. In this case, the mesh-like member can be arranged at a more accurate position. Further, by providing the adhesive member at the position which avoids the wire connection portion. Therefore, the adhesive member and the wire connection portion do not overlap with each other whereby favorable water draining property at the wire connection portion can be secured, thus effectively preventing the trapping of moisture.

BRIEF DESCRIPTION

DETAILED DESCRIPTION

Hereinafter, the harness wiring structure of a saddle-ride-type vehicle according to embodiments of the present invention is explained in conjunction with attached drawings.

Figure 1:
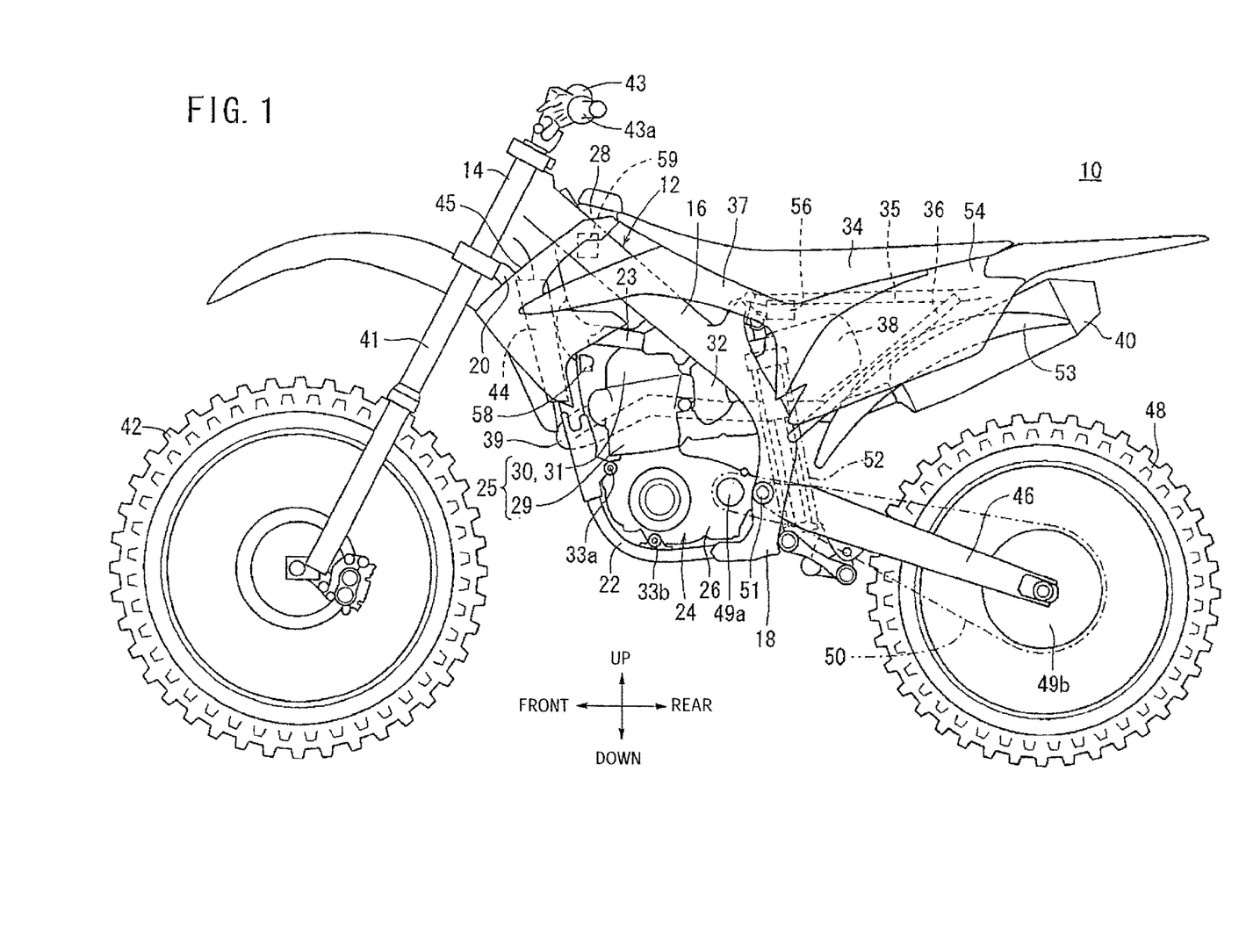
FIG. 1: A side view of a motorcycle which is a saddle-ride-type vehicle including the harness wiring structure according to one embodiment of the present invention.

FIG. 1 is a side view of a motorcycle 10 which is a saddle-ride-type vehicle including the harness wiring structure according to the present invention. Although the motorcycle 10 is shown in this example as an off-road-type motorcycle, the present invention is not limited to such an off-road-type motorcycle, and the present invention is also applicable to other kinds of motorcycles and vehicles. Here, to facilitate the understanding of the invention, in respective drawings consisting of FIG. 1 to FIG. 5, the vertical direction of a vehicle, the longitudinal direction of the vehicle, and the lateral direction of the vehicle are respectively indicated by a two headed arrow.

In this example, a vehicle body frame 12 of the motorcycle 10 can include a head pipe 14, main frames 16, center frames 18, a down frame 20, and lower frames 22. These frames can be connected with each other in a loop shape, and an engine 24 is supported by the frames inside the loop shape. The engine 24 can include a cylinder 25 and a crankcase 26. The main frames 16, the center frames 18, and the lower frames 22 are provided in a left and right pair respectively, and one head pipe 14 and one down frame 20 are arranged along the center of a vehicle body.

The main frames 16 can extend linearly and obliquely in the downward and rearward direction above the engine 24, and are connected to upper end portions of the center frames 18 which extend in the vertical direction behind the engine 24. The down frame 20 extends obliquely in the downward direction in front of the engine 24 and has a lower end portion thereof connected to a front end portion of the lower frames 22. Sub frame 23 which connects the main frames 16 and the down frame 20 to each other are arranged at a height between a fuel tank 28 and the engine 24. The lower frames 22 are bent to an area below the engine 24 from a front lower portion of the engine 24 extend substantially linearly in the rearward direction, and have rear end portions thereof connected to lower end portions of the center frames 18.

In this example, engine 24 is a water-cooled 4-cycle engine, and the cylinder 25 is mounted on a front portion of the crankcase 26 in an upright state such that an axis of the cylinder 25 is arranged in the substantially vertical direction. The cylinder 25 includes a cylinder block 29, a cylinder head 30 and a head cover 31 in order from below to above. By mounting the cylinder 25 in an upright state, a length in the longitudinal direction of the engine 24 can be shortened thus making the constitution of the engine 24 suitable for an off-road-type vehicle. The engine 24 is fixed to the lower frames 22 at mount portions 33a, 33b.

The fuel tank 28 can be arranged above the engine 24 and is supported on the main frames 16. A built-in-type fuel pump (not shown in the drawing) is housed in the inside of the fuel tank 28, and a highly pressurized fuel is supplied to a throttle body 32 from the fuel pump through a fuel supply pipe. A seat 34 is typically arranged behind the fuel tank 28, and is supported on seat frames 35 which extend rearward from upper ends of the center frames 18. A rear frame 36 is arranged below the seat frame 35.

An air cleaner 38 is supported on the seat frames 35 and the rear frame 36, and the air cleaner 38 draws or sucks air into the cylinder head 30 from a rear side of the vehicle body by way of the throttle body 32. On both sides of the air cleaner 38 in the vehicle widthwise direction, a pair of left and right air cleaner covers 37 are arranged, and both left and right sides of the air cleaner 38 are covered with the air cleaner covers 37.

In this example, an exhaust pipe 39 is mounted on a front portion of the cylinder 25. The exhaust pipe 39 extends toward a front side of the crankcase 26 from the front portion of the cylinder 25, is bent toward a right side and, thereafter, is routed around in the rearward direction on a right side of the vehicle body. A muffler 40 extends in the rearward direction from the exhaust pipe 39. A rear end portion of the muffler 40 is supported on the rear frame 36.

A front fork 41 is supported on the head pipe 14, and a front wheel 42 which is supported on a lower end portion of the front fork 41 is steered by a handle 43. Here, a grip 43a is mounted on left and right end portions of the handle 43, and a right end portion of the grip 43a constitutes a throttle grip (FIG. 1 showing only a left grip 43a).

A radiator 44 is arranged in front of the fuel tank 28 and the cylinder 25. A pair of left and right radiator shrouds 45 are mounted on both sides of the radiator 44 in the vehicle widthwise direction. The radiator shrouds 45 are fixed to the main frames 16, and cover the radiator 44 from both sides in the vehicle widthwise direction.

Front end portions of rear swing arms 46 are swingably supported on the center frames 18 using a pivot shaft 51. A rear wheel 48 is supported on rear end portions of the rear swing arms 46, and the rear wheel 48 is driven by a drive chain 50 which is wound around a drive sprocket wheel 49a of the engine 24 and a driven sprocket wheel 49b of the rear wheel 48. The drive chain 50 is routed in the longitudinal direction along the rear swing arm 46 on a left side of the vehicle body opposite to the side where the exhaust pipe 39 is arranged, and the chain 50 is vertically moved along with the vertical swinging of the rear swing arms 46 about the pivot shaft 51. Further, a rear cushion 52 is arranged between the rear swing arms 46 and rear end portions of the center frames 18.

A rear fender 53 which extends in an approximately arcuate shape is arranged below the seat 34 and between the air cleaner 38 and the rear wheel 48 in a state where the rear fender 53 is supported on the rear frame 36. A pair of left and right side covers 54 which extend in the longitudinal direction are arranged outside the rear frame 36 and the rear fender 53 in the vehicle widthwise direction.

An ECU (Engine Control Unit) 56, which, in this example, systematically controls the engine 24 is arranged below the seat 34. In the constitution shown in the drawing, the ECU 56 is fixed to the seat frames 35 by way of an ECU stay 57 (see FIG. 4). The ECU 56 is thus positioned and held below the seat 34.

An ignition coil 58 (see also FIG. 2) which supplies electricity to an ignition plug (not shown in the drawing) mounted on the engine 24 is arranged above the engine 24 and behind the radiator 44. A service check coupler 59 (see also FIG. 3) is arranged outside the right main frame 16. The service check coupler 59 is a coupler provided for electrically connecting the ECU 56 and an external computer, and the communication between the external computer and the ECU 56 is established through the service check coupler 59 so that a failure diagnosis and engine setting can be performed.

Figure 2:
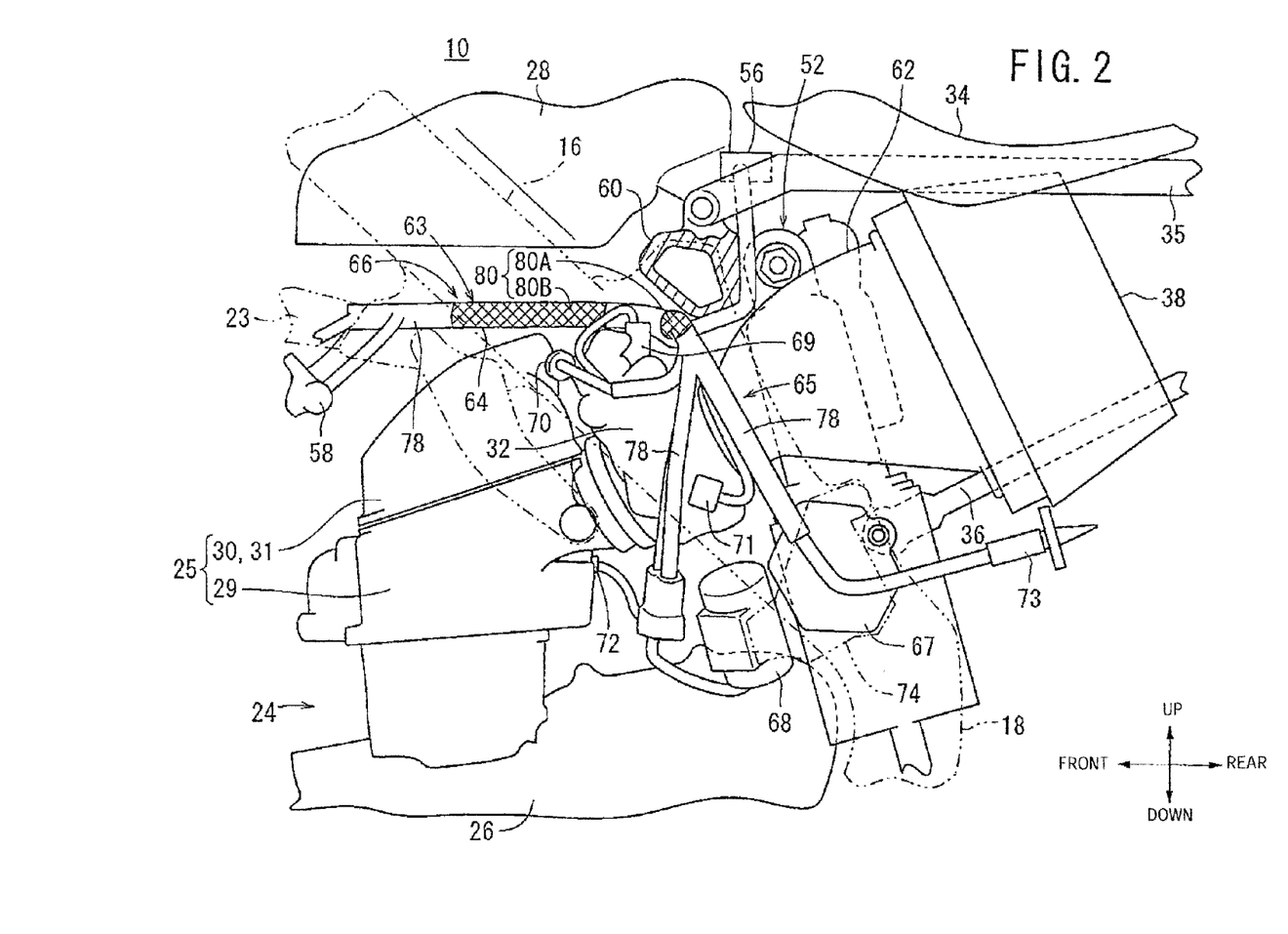
FIG. 2 illustrates a side view of an essential part of the motorcycle shown in FIG. 1.
Figure 3:
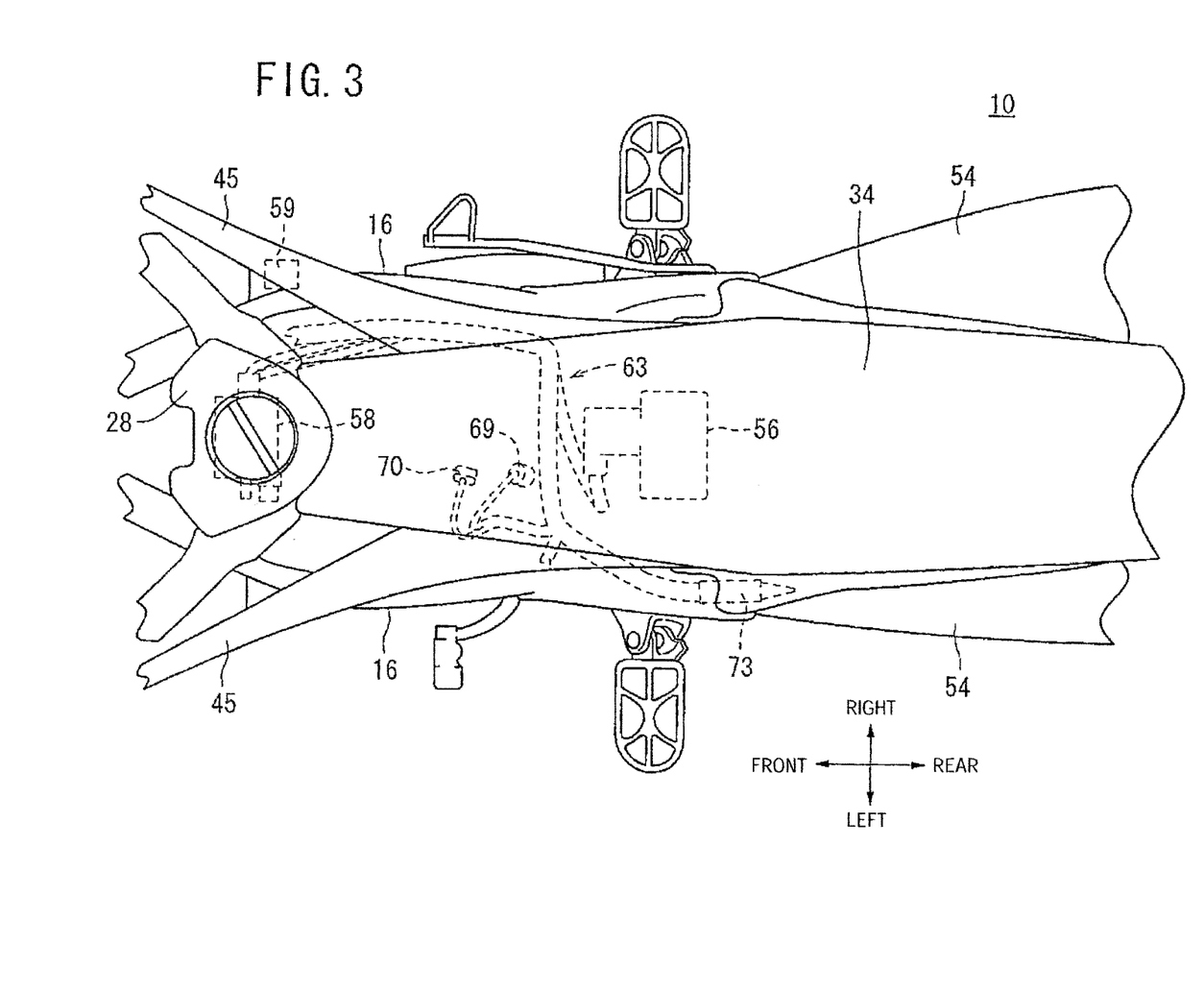
FIG. 3 shows a plan view of an essential part of the motorcycle shown in FIG. 1.
Figure 4:
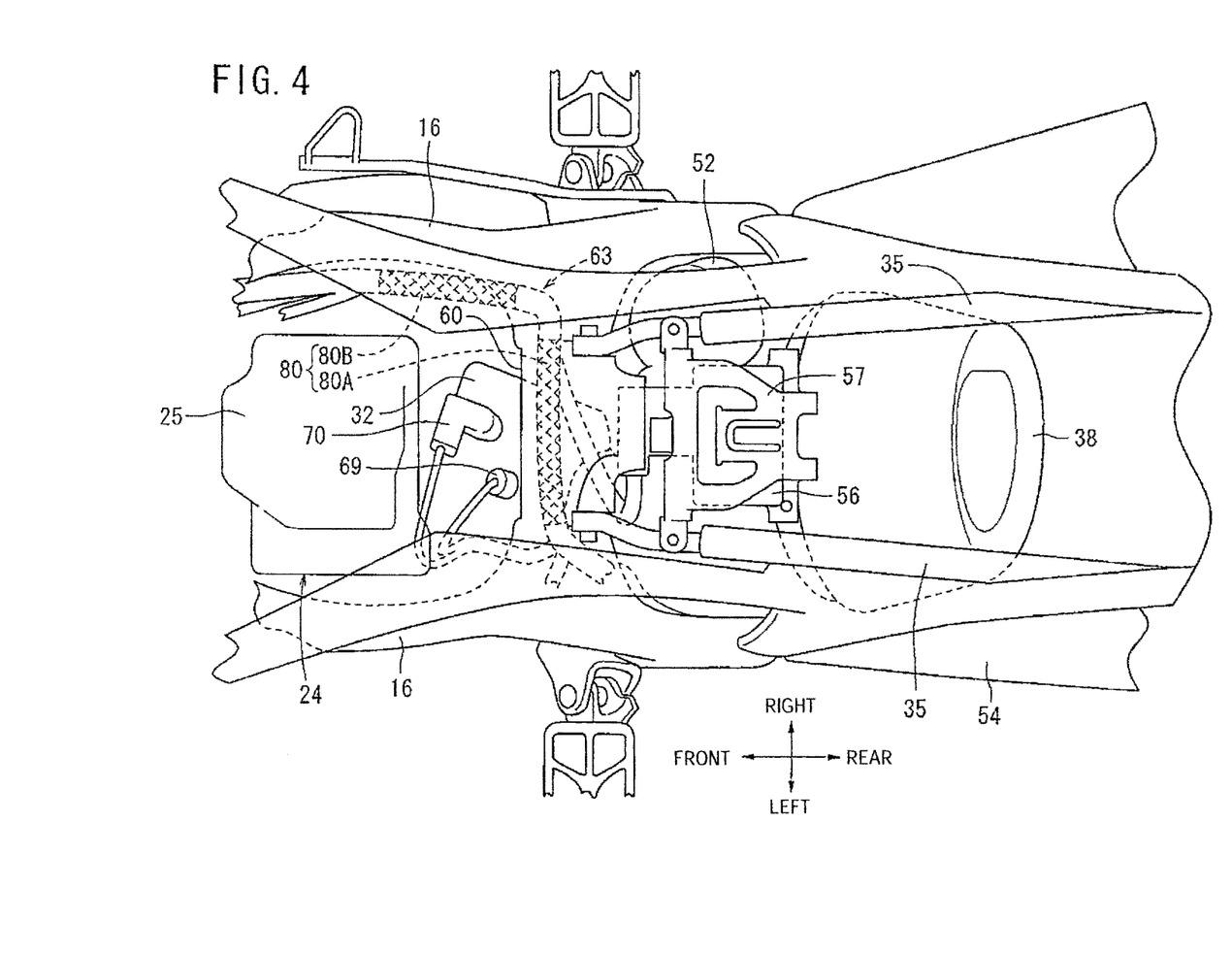
FIG. 4 shows a plan view of the constitution shown in FIG. 3 in a state where a seat is removed.
Figure 5:
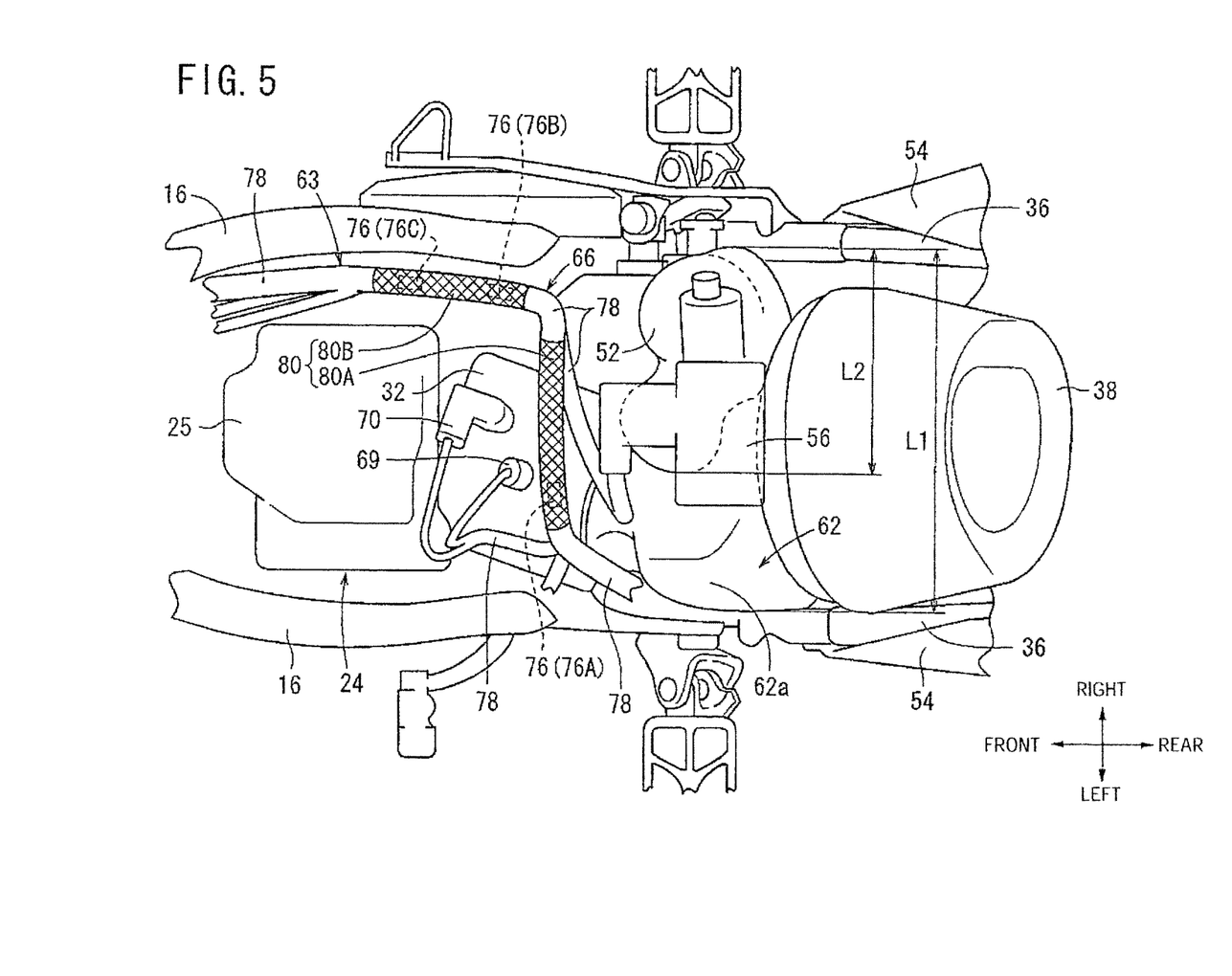
FIG. 5 shows a plan view of the constitution shown in FIG. 4 in a state where a part of main frames, a cross pipe and an exterior part are removed.

FIG. 2 is a side view of an essential part of the motorcycle 10, and FIG. 3 is a plan view of the essential part of the motorcycle 10. Further, FIG. 4 is a plan view showing the constitution in FIG. 3 in a state where the seat 34 is removed, and FIG. 5 is a plan view showing the constitution in FIG. 4 in a state where a part of the main frames 16, a cross pipe 60 and an exterior are removed. Here, for facilitating the understanding of the structure, in FIG. 2, the main frame 16 and the center frame 18 are indicated by an imaginary line, and the cross pipe 60 is shown in cross section.

As shown in FIG. 2 to FIG. 5, the vehicle body frame 12 can further include, at a position above the engine 24, the cross pipe 60 which extends in the vehicle widthwise direction and connects the left and right main frames 16. Distal end portions of the above-mentioned seat frames 35 are connected to the cross pipe 60. An upper end portion of the rear cushion 52 is rotatably connected to an approximately vehicle widthwise center portion of a rear portion of the cross pipe 60.

The throttle body 32 is connected to a rear portion of the cylinder block 29 above the crankcase 26. Between the throttle body 32 and the air cleaner 38 and also on a side of the rear cushion 52, a connecting tube 62 which forms a flow passage for introducing air which passes through the air cleaner 38 into the throttle body 32 is arranged.

As shown in FIG. 5, the connecting tube 62 includes a bent portion 62a which is bent in an outwardly bulging manner in the vehicle widthwise direction. Here, in the example shown in FIG. 5, the bent portion 62a is bent in a bulging manner toward a left side of the vehicle. In this manner, an intake system which supplies air drawn or sucked from the air cleaner 38 to the engine 24 through the connecting tube 62 and the throttle body 32 is constituted.

The motorcycle 10 is provided with a harness 63 which electrically connects plural electric parts including the ECU 56 and the ignition coil 58 to each other. The harness 63 is formed by tying plural electric wires 61 (see FIG. 7B) in a bundle by covering the plural electric wires 61 with a covering member 64, and the harness 63 is arranged along the vehicle body frame 12. Since the parts such as the engine 24 and the throttle body 32 are arranged on the vehicle body frame 12, the harness 63 is arranged so as to avoid these parts. To be more specific, as shown in FIG. 2, the harness 63 includes a vertically extending portion 65 which extends in the vertical direction and a horizontally extending portion 66 which extends in the horizontal direction.

As shown in FIG. 2 and FIG. 3, the harness 63 is electrically connected to the ECU 56, the ignition coil 58, the service check coupler 59, a regulator 67, a smoothing capacitor 68, a fuel injection device 69, an intake negative pressure sensor 70, a throttle sensor 71, a water temperature sensor 72 and an intake air temperature sensor 73.

The regulator 67 is provided for supplying electricity from an ACG (AC generator), not shown in the drawing, which is mounted on the engine 24 to the harness 63 after stabilizing electricity. The regulator 67 is fixed to the center frames 18 by way of a stay 74. The smoothing capacitor 68 is provided for smoothing a voltage of a power source system containing the harness 63 and is fixed to the center frames 18 by way of the stay 74.

The intake negative pressure sensor 70 is mounted on the throttle body 32, and a detection signal outputted from the intake negative pressure sensor 70 is transmitted to the ECU 56 via the harness 63 so that an intake negative pressure is monitored by the ECU 56. The throttle sensor 71 is mounted on the throttle body 32, and a detection signal outputted from the throttle sensor 71 is transmitted to the ECU 56 via the harness 63 so that the ECU 56 obtains a throttle opening. The water temperature sensor 72 is mounted on the engine 24, and a detection signal outputted from the water temperature sensor 72 is transmitted to the ECU 56 via the harness 63. The intake air temperature sensor 73 is mounted on the air cleaner 38, and a detection signal outputted from the intake air temperature sensor 73 is transmitted to the ECU 56 via the harness 63. The ECU 56 performs a drive control of the engine 24 based on the signals from the respective sensors.

Figure 6A:
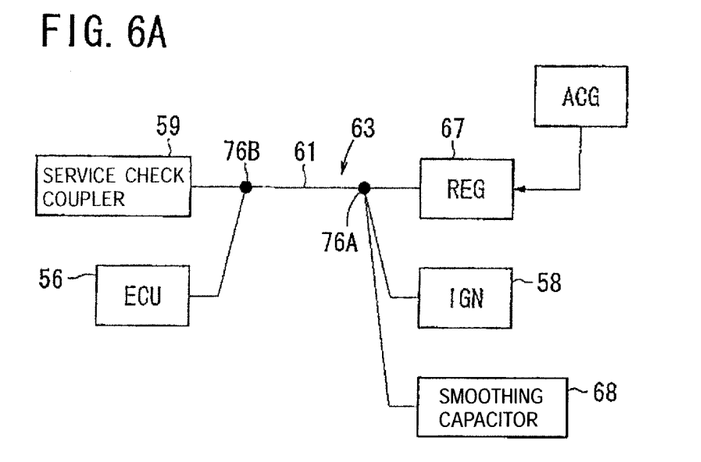
FIG. 6A is a block diagram showing a circuit constitution of a power source system.

Here, FIG. 6A is a block diagram showing the circuit constitution of the power source system. As shown in FIG. 6A, for connecting the respective electric wires 61 of the service check coupler 59, the ECU 59, the regulator 67, the ignition coil 58 and the smoothing capacitor 68 to each other, the harness 63 includes wire connection portions 76A, 76B.

Figure 6B:
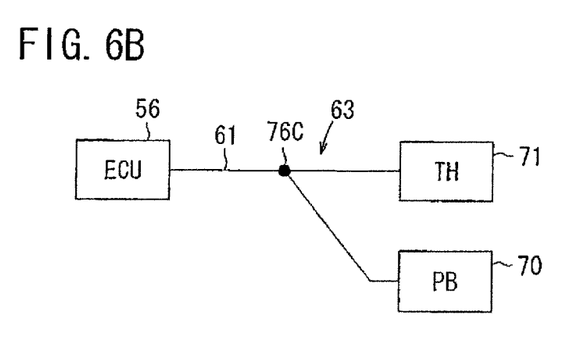
FIG. 6B is a block diagram showing a circuit constitution of a sensor drive system.

FIG. 6B is a block diagram showing an example of a circuit constitution of a sensor drive system. As shown in FIG. 6B, for connecting the respective electric wires 61 of the throttle sensor 71 and the intake negative pressure sensor 70 to each other, the harness 63 can also be provided with another wire connection portion 76C. These wire connection portions 76A, 76B, 76C are formed by connecting the electric wires 61 to each other by caulking or soldering, for example. In the explanation made hereinafter, when it is unnecessary to specifically distinguish the wire connection portions 76A, 76B, 76C from each other, the wire connection portions 76A, 76B, 76C are respectively simply referred to as "wire connection portion 76" by omitting the alphabetic designation in the symbols.

In the harness 63 according to an embodiment of the present invention, the covering member 64 includes covering portions 78 which cover the electric wires 61 in a state where the electric wires 61 are not exposed from outer surfaces of the covering portions 78, and a mesh-like portion 80 which covers the wire connection portion 76 where the electric wires 61 are connected with each other. The covering portions 78 may be formed of a flexible resin-made tube which has been conventionally used as a harness protection member, or a member which is formed by spirally winding an adhesive tape made of, for example, PVC (polyvinyl chloride), for example.

The mesh-like portion 80 is constituted of a mesh-like member 82 which is formed into a mesh thus having gaps (see FIG. 7A), and the mesh-like portion 80 is arranged to cover the wire connection portions 76A, 76B, 76C where the electric wires 61 are connected with each other. In the harness 63 which is wired in the motorcycle 10 shown in the drawing, the wire connection portions 76A, 76B, 76C are positioned at the horizontally extending portion 66. To be more specific, the wire connection portion 76A is arranged at a part of the horizontally extending portion 66 which extends in the vehicle widthwise direction, and other wire connection portions 76B, 76C are arranged at parts of the horizontally extending portion 66 which extend in the vehicle longitudinal direction.

As shown in FIG. 5, the mesh-like portion 80 includes a widthwise portion 80A which extends in the vehicle widthwise direction and a longitudinal portion 80B which extends in the longitudinal direction of the vehicle. The wire connection portion 76A is covered with the widthwise portion 80A, and the wire connection portions 76B, 76C are covered with the longitudinal portion 80B. The mesh-like portion 80 is formed on only specific parts of the horizontally extending portion 66, and the electric wires 61 are covered with the covering portions 78 at portions of the harness 63 other than the mesh-like portion 80.

As shown in FIG. 2 and FIG. 4, the mesh-like portion 80 is arranged in the inside between the left and right main frames 16. Accordingly, both sides of the mesh-like portion 80 in the vehicle widthwise direction are covered with the left and right main frames 16. Further, as shown in FIG. 2 and FIG. 3, the mesh-like portion 80 is covered with the seat 34 and the fuel tank 28 from above. Still further, the mesh-like portion 80 is covered with the rear fender 53 from behind (see FIG. 1), and is arranged in front of the air cleaner 38, the connecting tube 62 and the rear cushion 52.

As shown in FIG. 2 and FIG. 4, the widthwise portion 80A is arranged between the cross pipe 60 and the throttle body 32. That is, the widthwise portion 80A is arranged below the cross pipe 60 and is arranged above the throttle body 32. Accordingly, the widthwise portion 80A is covered with the cross pipe 60 from above, and is covered with the throttle body 32 from below.

Further, as shown in FIG. 5, the widthwise portion 80A is arranged within a vehicle widthwise range corresponding to a vehicle widthwise distance L1 from a vehicle widthwise outer end portion of the connecting tube 62 (a right end portion of the connecting tube 62 in the embodiment shown in the drawing) to a vehicle widthwise outer end portion of the rear cushion 52 (a left end portion of the rear cushion 52 in the embodiment shown in the drawing). Accordingly, the widthwise portion 80A is covered with the rear cushion 52 and the connecting tube 62 from behind over the whole length thereof.

As shown in FIG. 5, the longitudinal portion 80B of the mesh-like portion 80 is arranged within a vehicle widthwise range corresponding to a vehicle widthwise distance L2 between both vehicle widthwise end portions of the rear cushion 52 and also in front of the rear cushion 52. Accordingly, the longitudinal portion 80B is covered with the rear cushion 52 from behind.

The harness wiring structure according to an embodiment of the present invention can basically constituted as described above, and the manner of operation and advantageous effects of the harness wiring structure are explained hereinafter.

According to the harness wiring structure of this embodiment, the wire connection portion 76 where the electric wires 61 are connected with each other is covered with the mesh-like portion 80. Therefore, water draining properties can be enhanced at the wire connection portion 76 where water is liable to enter the inside of the harness 63; trapping of moisture can be prevented. Further, the mesh-like portion 80 is arranged inside the main frames 16; therefore, even in the saddle-ride-type vehicle where the harness 63 is liable to get wet with water, it is possible to prevent the mesh-like portion 80 and the wire connection portion 76 per se covered with the mesh-like portion 80.

Further, it is sufficient that the mesh-like portion 80 covers a portion of the harness 63 where the wire connection portion 76 is provided without covering the whole harness 63, and the covering portions 78 which are not in a mesh form are mounted on remaining portions of the harness 63. Due to such a configuration, the harness 63 with high water draining property can be formed at a low cost. In this manner, according to the harness wiring structure of embodiments of the present invention, water draining property at the wire connection portion 76 can be enhanced by the mesh-like portion 80 and also wetting of the wire connection portion 76 with water can be suppressed while suppressing the increase of a manufacturing cost.

The mesh-like portion 80 is provided to the horizontally extending portion 66 and hence, the mesh-like portion 80 is unnecessary in the vertical direction since water is easily drained downward, and in the horizontal direction with a small difference of elevation, water draining property at the wire connection portion 76 can be enhanced thus more effectively preventing the intrusion of water into the inside of the harness 63.

In this embodiment, the mesh-like portion 80 is covered with the seat 34 and the fuel tank 28 from above. Therefore, the mesh-like portion 80 can be shielded by the seat 34 and the fuel tank 28 from above. Accordingly, wetting of the mesh-like portion 80 with water from above the vehicle can be prevented.

Also, in this embodiment, the mesh-like portion 80 is covered with the rear fender 53 from behind. With the provision of the rear fender 53, it is possible to prevent wetting of the mesh-like portion 80 with water from a rear side of the vehicle due to splashing of water, mud, or the like from the rear wheel 48.

The mesh-like portion 80 can be arranged below the cross pipe 60 and hence, the mesh-like portion 80 can be covered with the cross pipe 60 from above whereby wetting of the mesh-like portion 80 with water can be prevented more effectively.

The mesh-like portion 80 can include the widthwise portion 80A which extends in the vehicle widthwise direction, and the widthwise direction 80A is arranged above the throttle body 32 and hence, the widthwise portion 80A can be covered with the throttle body 32 from below whereby wetting of the mesh-like portion 80 with water from below can be prevented.

The widthwise portion 80A can be arranged in front of the air cleaner 38, the connecting tube 62 and the rear cushion 52. Therefore, a vehicle rear side of the widthwise portion 80A of the mesh-like portion 80 can be covered with the air cleaner 38, the connecting tube 62 and the rear cushion 52 whereby the influence of splashing of mud or water from the rear wheel 48 or the like on the mesh-like portion 80 can be further reduced.

The widthwise portion 80A can be arranged within the vehicle widthwise range corresponding to the distance L1 from the vehicle widthwise outer end portion of the connecting tube 62 to the vehicle widthwise outer end portion of the rear cushion 52. Therefore, the whole widthwise portion 80A can be covered with the rear cushion 52 and the connecting tube 62 whereby wetting of the widthwise portion 80A with water from the rear wheel 48 can be prevented more effectively.

[The mesh-like portion 80 can include the longitudinal portion 80B which extends in the longitudinal direction of the vehicle. The longitudinal portion 80B can be arranged within the vehicle widthwise range corresponding to the distance L2 between the both vehicle widthwise end portions of the rear cushion 52 and in front of the rear cushion 52. Therefore, the vehicle rear side of the longitudinal portion 80B can be covered with the rear cushion 52 whereby the influence of splashing of mud and water from the rear wheel 48 or the like on the mesh-like portion 80 can be reduced more effectively.

Figure 7A:
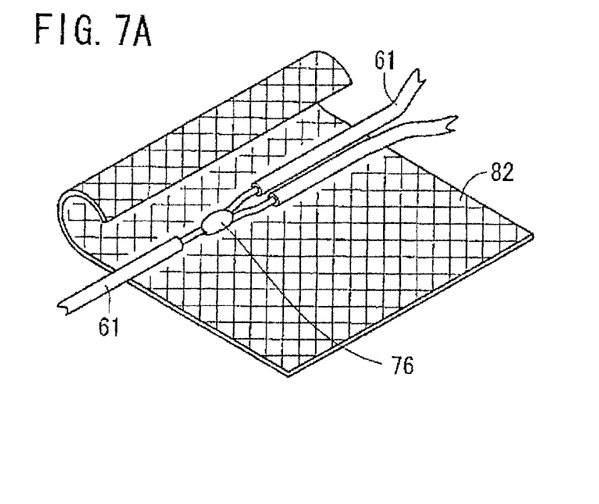
FIG. 7A is view for explaining a forming method of a mesh-like portion.
Figure 7B:
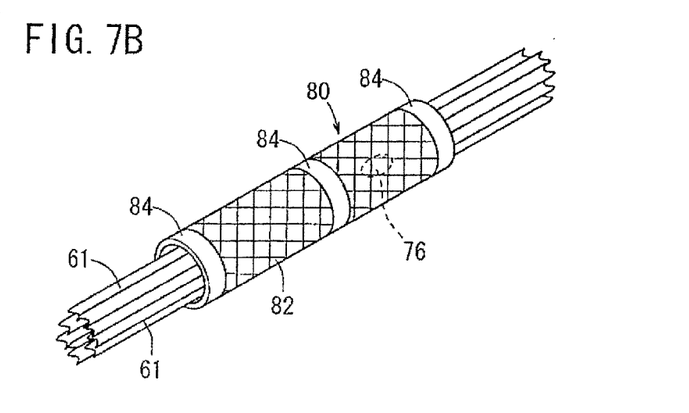
FIG. 7B is a perspective view of the mesh-like portion which covers a wire connection portion.

The above-mentioned mesh-like portion 80 is, for example, formed by using a method explained hereinafter. As shown in FIG. 7A, the mesh-like member 82 having a proper size and a shape (quadrangular shape in the example shown in the drawing) is prepared, and the mesh-like member 82 is wound around the electric wires 61 so as to cover the wire connection portion 76 of the electric wires 61. Here, other electric wires 61 having no wire connection portion 76 are also tied in a bundle together with the wire connection portion 76 by winding the mesh-like member 82. Further, as shown in FIG. 7B, by adhering an adhesive tape (adhesive member) 84 to proper portions (both end portions of a tube shape and a portion therebetween in the embodiment shown in the drawing) and by maintaining the mesh-like member 82 in a tube shape, the mesh-like portion 80 is formed.

In this manner, the mesh-like member 82 is wound around the wire connection portion 76 and is fixed by the adhesive tape 84 and hence, the mesh-like member 82 can be easily mounted on the wire connection portion 76, and also the mesh-like member 82 can be easily mounted on the wire connection portion 76 after wiring the harness 63. In this case, the mesh-like member 82 can be arranged at a more accurate position. Further, as shown in FIG. 7B, it is preferable to provide the adhesive tape 84 at the position which avoids the wire connection portion 76. Due to such a constitution, the adhesive tape 84 and the wire connection portion 76 do not overlap with each other and hence, favorable water draining property at the wire connection portion 76 can be secured thus effectively preventing staying of moisture.

Here, as a means for maintaining the mesh-like member 82 in a tube shape, another fixing means (for example, adhesive agent) may be used in place of the adhesive tape 84.

Although the present invention has been explained by taking the preferred embodiment as an example heretofore, and it is needless to say that the present invention is not limited to the above-mentioned embodiment, and various modifications are conceivable without departing from the gist of the present invention.

DESCRIPTION OF REFERENCE MATERIALS AND SIGNS

10: motorcycle (saddle-ride-type vehicle)
12: vehicle body frame
16: main frame
28: fuel tank
32: throttle body
34: seat
38: air cleaner
52: rear cushion
60: cross pipe
61: electric wire
62: connecting tube
62a: bent portion
63: harness
64: covering member
65: vertically extending portion
66: horizontally extending portion
76, 76A, 76B, 76C: wire connection portion
78: covering portion
80: mesh-like portion
80A: widthwise portion
80B: longitudinal portion
82: mesh-like member
84: adhesive tape (adhesive member)

The invention claimed is:

1. A harness wiring structure of a saddle-ride-type vehicle, said harness wiring structure comprising:
   a harness comprising a plurality of electric wires held in a bundle by a covering member, the harness electrically connecting a plurality of electric parts to each other, and the harness being configured to be disposed along a vehicle body frame,
   wherein the covering member includes a covering portion which covers the electric wires in a state where the electric wires are not exposed to the outside from an outer surface thereof, and a mesh-like portion which is formed of a mesh-like member and covers a wire connection portion where the electric wires are connected with each other, and wherein the mesh-like portion is disposed in an inside defined between left and right main frames of the vehicle body frame.

2. The harness wiring structure of a saddle-ride-type vehicle according to claim 1, wherein
the harness includes a vertically extending portion which extends in a vertical direction and a horizontally extending portion which extends in a horizontal direction, and wherein
the mesh-like portion is disposed on the horizontally extending portion.

3. The harness wiring structure of a saddle-ride-type vehicle according to claim 1, wherein
the mesh-like portion is configured to be covered with a seat and a fuel tank.

4. The harness wiring structure of a saddle-ride-type vehicle according to claim 1, wherein
the mesh-like portion is configured to be disposed in front of a rear fender.

5. The harness wiring structure of a saddle-ride-type vehicle according to claim 2, wherein
the vehicle body frame further includes a cross pipe which connects the left and right main frames, and wherein the mesh-like portion is disposed below the cross pipe.

6. The harness wiring structure of a saddle-ride-type vehicle according to claim 2, wherein
the saddle-ride-type vehicle further includes an intake system which supplies air from an air cleaner to an engine through a connecting tube and a throttle body, the mesh-like portion includes a widthwise portion which extends in the vehicle widthwise direction, and wherein the widthwise portion is disposed above the throttle body.

7. The harness wiring structure of a saddle-ride-type vehicle according to claim 6, wherein
the saddle-ride-type vehicle further includes a rear cushion on a side of the connecting tube, and wherein
the widthwise portion is arranged in front of the air cleaner, the connecting tube and the rear cushion.

8. The harness wiring structure of a saddle-ride-type vehicle according to claim 7, wherein
the connecting tube includes a bent portion which is bent in a bulging manner toward the outside in the vehicle widthwise direction, and wherein
the widthwise portion is disposed within a vehicle widthwise range corresponding to a distance from a vehicle widthwise outer end portion of the connecting tube to a vehicle widthwise outer end portion of the rear cushion.

9. The harness wiring structure of a saddle-ride-type vehicle according to claim 2, wherein
the saddle-ride-type vehicle further includes an intake system which supplies air from an air cleaner to an engine through a connecting tube and a throttle body, and a rear cushion which is disposed on a side of the connecting tube,
the mesh-like portion includes a longitudinal portion which extends in the longitudinal direction of the vehicle, and wherein
the longitudinal portion is disposed within a vehicle widthwise range corresponding to a distance between both vehicle widthwise end portions of the rear cushion and in front of the rear cushion.

10. The harness wiring structure of a saddle-ride-type vehicle according to claim 1, wherein
the mesh-like portion is configured to maintain a tube shape by an adhesive member laminated to the mesh-like member wound around the wire connection portion, and wherein the adhesive member is disposed at a position which avoids the wire connection portion.

11. A vehicle, comprising:
a vehicle body frame including left and right main frames; and
a harness, said harness comprising a plurality of electric wires held in a bundle by a covering member, the harness electrically connecting a plurality of parts to each other, wherein the harness is disposed along the vehicle body frame, and wherein the covering member includes a covering portion which covers the electric wires in a state where the electric wires are not exposed to the outside from an outer surface thereof, wherein a mesh-like portion is formed of a mesh-like member and covers a wire connection portion where the electric wires are connected with each other, and wherein the mesh-like portion is disposed in an inside defined between the left and right main frames.

12. The vehicle according to claim 11, wherein the harness includes a vertically extending portion extending in a vertical direction and a horizontally extending portion extending in a horizontal direction, and wherein the mesh-like portion is disposed on the horizontally extending portion.

13. A vehicle according to claim 11, wherein the mesh-like portion is disposed under a seat and a fuel tank.

14. A vehicle according to claim 11, wherein the mesh-like portion is disposed in front of a rear fender, whereby the rear fender is configured to prevent material being splashed onto the mesh-like portion from a rear tire.

15. A vehicle according to claim 11, wherein the vehicle body frame comprises a cross pipe connecting the left and right main frame, and wherein the mesh-like portion is disposed below the cross pipe.

16. A vehicle according to claim 11, further comprising:
an intake system configured to supply air from an air cleaner to an engine through a connecting tube and a throttle body,
wherein the mesh-like portion includes a widthwise portion extending in the vehicle widthwise direction, wherein the widthwise portion is disposed above the throttle body.

17. A vehicle according to claim 16, further comprising:
a rear cushion disposed on a side of the connecting tube, wherein the widthwise portion is arranged in front of the air cleaner, the connecting tube and the rear cushion.

18. A vehicle according to claim 17, wherein the connecting tube includes a bent portion which is bent in a bulging manner toward the outside in the vehicle widthwise direction, and wherein the widthwise portion is disposed within a vehicle widthwise range corresponding to a distance from a vehicle outer end portion of the connecting tube to a vehicle widthwise outer end portion of the rear cushion.

19. A vehicle according to claim 11, further comprising:
an intake system configured to supply air from an air cleaner to an engine through a connecting tube and a throttle body; and
a rear cushion disposed on a side of the connecting tube, wherein the mesh-like portion includes a longitudinal portion extending in a longitudinal direction of the vehicle, and wherein the longitudinal portion is disposed within a vehicle widthwise range corresponding to a distance between both vehicle widthwise end portions of the rear cushion and in front of the rear cushion.

20. The vehicle according to claim 11, wherein the mesh-like portion is configured to maintain a tube shape by an adhesive member laminated to the mesh-like member around the wire connection portion, and wherein the adhesive member is disposed at a position which avoids the wire connection portion.

* * * * *